US012035452B2

(12) United States Patent
Deuringer et al.

(10) Patent No.: US 12,035,452 B2
(45) Date of Patent: Jul. 9, 2024

(54) OPERATING AN X-RAY TUBE

(71) Applicant: Siemens Healthcare GmbH, Erlangen (DE)

(72) Inventors: Josef Deuringer, Herzogenaurach (DE); Karsten Kruschat, Nuremberg (DE); Gerd Moersberger, Bubenreuth (DE)

(73) Assignee: Siemens Healthineers AG, Forchheim (DE)

( * ) Notice: Subject to any disclaimer, the term of this patent is extended or adjusted under 35 U.S.C. 154(b) by 121 days.

(21) Appl. No.: 17/897,325

(22) Filed: Aug. 29, 2022

(65) Prior Publication Data

US 2023/0069782 A1 Mar. 2, 2023

(30) Foreign Application Priority Data

Sep. 1, 2021 (EP) .................................... 21194328

(51) Int. Cl.
*H05G 1/08* (2006.01)

(52) U.S. Cl.
CPC .................................. *H05G 1/085* (2013.01)

(58) Field of Classification Search
CPC ............ H05G 1/46; H05G 1/085; H05G 1/30; H05G 1/54; H05G 1/12; H05G 1/265; H05G 1/52; H05G 1/32; H05G 1/48; H05G 1/58; H05G 1/70; H05G 1/56; A61B 6/56; A61B 6/02; A61B 6/405; A61B 6/482; H01J 35/147; H01J 3/021; H01J 35/065; H01J 2235/068; H01J 35/16; H01J 35/18; H01J 2235/062; H01J 35/116; H01J 2235/166; H01J 2235/168; H01J 35/08; H01J 35/12
USPC .......................................................... 378/113
See application file for complete search history.

(56) References Cited

U.S. PATENT DOCUMENTS

| | | | | |
|---|---|---|---|---|
| 4,361,901 | A | 11/1982 | Daniels et al. | |
| 2002/0034279 | A1* | 3/2002 | Hirano | H05G 1/62 378/114 |
| 2003/0021380 | A1* | 1/2003 | Brendler | H01J 35/045 378/154 |
| 2009/0058319 | A1 | 3/2009 | Berk et al. | |
| 2014/0161221 | A1* | 6/2014 | Miyazaki | H05G 1/085 378/16 |

(Continued)

FOREIGN PATENT DOCUMENTS

| | | |
|---|---|---|
| DE | 102007042108 A1 | 3/2009 |
| DE | 102017220991 A1 | 5/2019 |
| DE | 102020210118 A1 | 2/2022 |

*Primary Examiner* — Irakli Kiknadze
(74) *Attorney, Agent, or Firm* — Harness, Dickey & Pierce, P.L.C.

(57) ABSTRACT

An X-ray tube has at least one grid electrode arranged between an anode electrode and a cathode electrode. Via a focusing unit, an electron flow from the cathode electrode to the anode electrode is focused in that the focusing unit supplies the grid electrode with a first electric grid potential. The focusing unit is supplied with electrical energy in an electrically isolated manner via an energy converter. The first electric grid potential is provided via an adjustable voltage divider, and the adjustable voltage divider is adjusted via a control circuit of the focusing unit in that the control circuit is supplied with an electrically isolated control signal of a control unit. The control signal depends on a value for the first electric grid potential.

20 Claims, 7 Drawing Sheets

(56) References Cited

U.S. PATENT DOCUMENTS

| | | | | |
|---|---|---|---|---|
| 2018/0228011 | A1* | 8/2018 | Hirayama | H05G 1/10 |
| 2019/0159326 | A1* | 5/2019 | Proell | H05G 1/14 |
| 2020/0367350 | A1* | 11/2020 | Fritz | H05G 1/265 |
| 2022/0053626 | A1* | 2/2022 | Deuringer | H05G 1/085 |
| 2022/0086997 | A1* | 3/2022 | Wimmer | H05G 1/54 |
| 2023/0069290 | A1* | 3/2023 | Qiu | H01J 35/064 |

* cited by examiner

OPERATING AN X-RAY TUBE

CROSS-REFERENCE TO RELATED APPLICATION(S)

The present application claims priority under 35 U.S.C. § 119 to European Patent Application No. 21194328.7, filed Sep. 1, 2021, the entire contents of which are incorporated herein by reference.

FIELD

One or more example embodiments of the present invention relate to a method for operating an X-ray tube, which has at least one grid electrode arranged between an anode electrode and a cathode electrode, wherein via a focusing unit an electron flow from the cathode electrode to the anode electrode is focused in that the focusing unit supplies the grid electrode, at least in a focusing mode, with a first electric grid potential in order to focus the electron flow, and the focusing unit is supplied via an energy converter with electrical energy in an electrically isolated manner. One or more example embodiments of the present invention relate, moreover, to a circuit arrangement for operating an X-ray tube, which has at least one grid electrode arranged between an anode electrode and a cathode electrode, with a focusing unit for focusing an electron flow from the cathode electrode to the anode electrode, wherein the focusing unit is designed to supply the grid electrode, at least in a focusing mode, with a first electric grid potential in order to focus the electron flow, an energy converter for supplying the focusing unit with electrical energy in an electrically isolated manner, and a control unit electrically isolated from the X-ray tube for adjusting an electric power of the energy converter. Finally one or more example embodiments of the present invention also relate to an X-ray device with an X-ray tube, which has at least one grid electrode arranged between an anode electrode and a cathode electrode, and a circuit arrangement connected via a connecting cable to the X-ray tube for operating the X-ray tube.

BACKGROUND

X-ray tubes, methods for their operation and also circuit arrangements for them are known extensively in the prior art. X-ray tubes are a specific type of vacuum-electron tube, which in the present case serve to be able to provide X-ray radiation for different purposes during normal operation. X-ray devices are frequently also a component of imaging apparatuses, as are used, for example, in medical diagnosis or also in quality assurance. As a rule, the X-ray tube uses an operating principle in which by way of suitable adjustment of an electrical voltage between the cathode electrode and the anode electrode, the electrons are greatly accelerated in the manner of an electron flow and under predefined conditions impinge on the anode electrode. X-ray radiation is released in the process. The release of X-ray radiation can be influenced, inter alia, by an impingement region on the anode, which can be at least partially adjusted by focusing the electron flow.

In generic X-ray tubes an anode-cathode voltage applied between the anode electrode and the cathode electrode can be approximately 20 kV to approximately 150 kV if the X-ray tube has a single-pole design. With an X-ray tube with a two-pole design, the same anode/cathode voltage is always still applied, but the voltage from anode or cathode electrode in comparison with an electric reference potential, for example ground, is only half of the acceleration voltage. It can be approximately 30 kV to approximately 75 kV.

In the prior art it is customary to implement focusing and/or deflection of the electron flow via magnetic fields, which is provided via an appropriate magnetic field unit. In order to interrupt provision of X-ray radiation it has until now been customary to supply the at least one grid electrode with a suitable electrical potential, so that a grid-cathode voltage occurs between the grid electrode and the cathode electrode, which can lie, for example, in a range of approximately a few hundred volts to approximately 4 kV. With this kind of grid-cathode voltage, the electron flow in the X-ray tube can be pinched-off, so that substantially no electrons can reach the anode electrode anymore. The grid-cathode voltage, at which this effect occurs, is occasionally also referred to as a pinch-off voltage. As a rule, the electrical potential of the grid electrode is negative with respect to the electrical potential of the cathode electrode. Furthermore, as a rule, the electrical potential of the anode electrode is positive with respect to the cathode electrode.

The region of the anode electrode, on which the electrons substantially impinge during the generation of X-ray radiation, also referred to as the focus, is advantageously to be adjusted to respective operating modes, in particular in relation to the respective imaging method. A respective image quality can be attained for a respective application as a result. For this purpose a suitable focusing can be adjusted, or for example a compromise in relation to an image quality and optimally low stressing of the X-ray tube can be made.

In many X-ray devices, in particular in angiography, as a rule, this can be achieved only with difficulty with magnetic field units owing to the required size. Efforts are therefore being made to implement focusing at least partially no longer via magnetic fields but by way of focusing via electric fields. In this connection U.S. Pat. No. 4,361,901 discloses a multi-voltage X-ray switching system. For this purpose it is known to supply the at least one grid electrode, which can be arranged for example at least partially between the cathode electrode and the anode electrode and/or at least partially also next to the cathode electrode, with a suitable electrical potential for focusing. In this respect the term "between" preferably also includes an arrangement of the grid electrode at least partially in a region next to the cathode electrode. The grid electrode can thus have boundary plates next to the cathode electrode, webs between a cathode electrode with a segmented design and/or the like. DE 10 2007 042 108 A1 for example, which discloses an electron source, exhibits this kind of teaching.

SUMMARY

Even if this teaching has basically been proven in the prior art, there remains at least a problem when discharging a, as a rule, comparatively long high-voltage cable for actuating the X-ray tube when switching over from the pinch-off voltage to a predefinable grid-cathode voltage for focusing the electron flow.

With said teaching, the function of pinching-off the electron flow, for example by way of a voltage transformer with electrical isolation, is achieved for implementing electrical isolation, for which purpose for example an appropriately designed transformer can be provided, and with which the required pinch-off voltage can be provided quickly. The grid-cathode voltage can be reduced quickly, for example to approximately zero, via a short-circuit element whereby a parasitic capacitance of the connecting cable can also be discharged. As a rule, actual value feedback cannot be achieved with this circuitry owing to the required technical complexity, for which reason the grid-cathode voltage can be provided with only a low level of accuracy. For pinching-off the electron flow it is substantially sufficient to attain at least the pinch-off voltage and to simultaneously maintain the isolation strength of the system. Regulation for a sufficiently accurate adjustment of the grid-cathode voltage, in particular for focusing the electron flow in the X-ray tube, is not possible hereby, however.

In relation to focusing via an electric field, said voltage transformer has likewise been used already. Since, as a rule, a passive rectifier circuit is provided at an output terminal of the voltage transformer, the grid-cathode voltage can be changed only slowly. A time constant can be dependent, inter alia, on a grid-cathode capacitor and also a discharge resistor connected parallel hereto. Only an inaccurate adjustment of the grid potential can be achieved hereby, however. Furthermore, the discharge with a discharge resistor can result either in excessively long time constants on discharging, in particular with a large resistance value of the discharge resistor, or excessive power losses in the discharge resistor if the pinch-off voltage is applied.

One or more example embodiments of the present invention are based on the object of improving the use of the grid electrode not only for pinching-off the electron flow but in particular also for focusing of the electron flow.

As a solution, one or more example embodiments of the present invention propose a method, a circuit arrangement and an X-ray device.

Advantageous developments can be found by way of the additional features described herein.

In relation to a generic method, one or more example embodiments of the present invention propose in particular that the first electric grid potential is provided via an adjustable voltage divider of the focusing unit, the adjustable voltage divider is adjusted via a control circuit of the focusing unit in that the control circuit is supplied with at least one electrically isolated control signal of a control unit electrically isolated from the X-ray tube, wherein the control signal depends on a predefined value for the first electric grid potential, and an electric power of the energy converter is adjusted dependent on the predefined value for the first electric grid potential.

In relation to a generic circuit arrangement, one or more example embodiments of the present invention propose in particular that the focusing unit has an adjustable voltage divider and a control circuit for controlling the adjustable voltage divider, wherein the control unit is designed to provide at least one electrically isolated control signal for the control circuit, which depends on a predefined value for the first electric grid potential, wherein the control circuit is designed to adjust the adjustable voltage divider dependent on the at least one control signal, wherein the control unit is designed, moreover, to adjust the electric power of the energy converter dependent on the predefined value for the first electric grid potential.

In relation to a generic X-ray device, it is proposed in particular that the X-ray device has a circuit arrangement in accordance with one or more example embodiments of the present invention.

One or more example embodiments of the present invention are based, inter alia, on the idea, in particular with adjustments in relation to the focusing mode, of enabling a fast adjustment of the electric grid potential. In particular, one or more example embodiments of the present invention use the recognition that a parasitic electrical capacitance of a connecting cable, with which the focusing unit is electrically coupled to the X-ray tube, is to be transferred or discharged. By way of its construction the focusing unit is intended to assist the active transferring or discharging of the grid capacitance or the grid-cathode capacitance and also the capacitance of the connecting cable, so that the time constant can be reduced in the case of a change in potential, in particular in the context of the focusing operation. For this purpose the focusing unit uses the adjustable voltage divider, with which the desired advantageous effect can be achieved. The adjustable voltage divider namely makes it possible to improve, in particular to accelerate, the transferring or discharging of the parasitic capacitances as mentioned above. For example, a time constant on a change from a pinching-off of the electron flow to focusing of the electron flow, and therewith an effect of this change in potential on properties of the focus, can be reduced. Furthermore, it is possible, in particular in relation to a regulation of the grid-cathode voltage or of the grid potential, to couple the focusing unit to an electrical potential of the cathode electrode, whereby more accurate focusing of the electrode flow in the X-ray tube can be achieved. The use magnetic deflections and the drawbacks associated herewith can be largely avoided. In particular, the overall length required for a magnetic deflection can be reduced because the electrons no longer need to fly through a magnetic field. A capacitive focusing can take place with an existing focusing element in the region of the cathode electrode, for example a Wehnelt cylinder, for which reason the overall length can be reduced. One or more example embodiments of the present invention take into account for example the constructions and/or properties mentioned in the introduction in the process.

Furthermore, regulating can also be implemented during the cutoff mode or pinching-off of the electron flow in which an electrical voltage can remain limited in order to limit the voltage load of components.

To be able to achieve stable operation in connection with the energy converter for the adjustable voltage divider, the electric power of the energy converter is adjusted dependent on the predefined value for the first electric grid potential via the control unit.

Preferably it can be provided that the pinch-off potential or the pinch-off voltage is provided directly by the energy converter. By contrast, the focusing potential or the focusing voltage can be provided via the focusing unit, which can use an adjustable voltage divider for this. The focusing unit can be supplied with electrical energy for this by the energy converter. Furthermore, it is preferably provided that in the focusing mode the energy converter does not regulate to the grid potential or the grid voltage in order to avoid positive feedback. The energy converter can be adjusted in respect of the power to be provided dependent on a grid potential to be currently provided, so that reliable operation of the focusing unit in the respective operating state can be reliably ensured. For example a power loss of the focusing unit, in particular of the voltage divider, can be kept low as a result. Adjusting the power can also at least partially feature adjusting an electrical voltage provided by the energy converter. The energy converter therefore only needs to provide enough electric power that the focusing unit is also able to reliably adjust the grid potential to be adjusted. This can include an adjustment reserve.

The energy converter is preferably an electrical energy converter, which provides an energy-related coupling between at least two electric grids. The energy converter, occasionally also referred to as an energy transformer, can be designed to couple the electric grids in an electrically isolated manner. The energy converter serves to convert electrical energy in a first form into electrical energy in at least one second form. The energy converter can be designed to implement an energy conversion only unidirectionally. However it can also be designed to implement an energy conversion at least partially or temporarily bidirectionally.

In the present case, the focusing unit is supplied with electrical energy by the energy converter in an electrically isolated manner. As a result, the focusing unit electrically coupled to the grid electrode and the cathode electrode can be supplied with electrical energy free from potential via the energy converter for normal operation. The focusing unit can consequently be part of a first electric grid. An energy source providing the required electrical energy can consequently be part of a second electric grid. The first and the second electric grids can be coupled via the energy converter. It is possible that a first electric reference potential of the first electric grid is different from a second electric reference potential of the second electric grid as a result. This is advantageous, for example, if the anode electrode is electrically coupled to an electrical ground potential, wherein the cathode electrode, as a rule, is supplied with a considerably lower electrical potential during normal operation. A favorable energy supply can be achieved, in particular for the focusing unit, as a result. Due to the electrical isolation the energy converter can supply at least the focusing unit with electrical energy electrically free from potential. The power of the energy converter is preferably not controlled directly by the focusing unit. Instead, the power of the energy converter is preferably adjusted by the control unit. The control unit can in particular take into account, the power currently required for normal operation of the focusing unit and adjust the power of the energy converter dependent on this. In particular, the power of the energy converter can be adjusted directly by the control unit.

In principle this of course preferably also applies equally to any separate heat energy source, which can be used to supply a heater of the cathode electrode with electrical energy. The heat energy source is therefore preferably likewise designed free from potential. For this purpose the heat energy source can have an electrically isolated electrical heat energy converter. The energy converter(s) can draw for example electrical energy from a public power grid or an electrical energy store. In the present case, free from potential means, in particular, that no electrical connection to other electrical potentials of the circuit arrangement has to exist.

The control signals can be transferred in an electrically isolated manner using isolating cable transformers, isolating transformers, optocouplers and/or the like. A signaling coupling can be achieved free from potential between a signal source, for example a control unit, and a signal sink, for example the focusing unit, as a result.

Electrical potentials of the X-ray tube are preferably electrically isolated from electrical potentials of the control unit in order to achieve the electrical isolation.

The adjustable voltage regulator can have for example a series circuit comprising an electrical resistor and an electronic component adjustable in respect of its electrical conductivity, with the grid electrode of the X-ray tube being electrically coupled to a middle terminal of the series circuit. The electrical resistor can, in principle, of course also be supplemented or replaced by a constant current circuit. The adjustable voltage regulator can, in principle, have for example at least one adjustable resistive element, in particular said electronic component, for example a transistor, which is operated in linear mode, or the like. It is possible to be able to provide, using the electrical energy provided by the energy converter, the desired grid-cathode voltage or the desired electric grid potential for focusing the electron flow as a result. It has proven to be particularly advantageous if focusing of the electron flow is regulated via the focusing unit, in particular the control circuit. A substantially constant adjustment for generating the X-ray radiation can be achieved even with varying operating conditions as a result.

For this purpose the control circuit can have an appropriate regulating circuit, which is coupled to a suitable measuring sensor. The measuring sensor can detect for example the emitted X-ray radiation and provide a suitable sensor signal for the control circuit or the circuit arrangement. The control circuit or the circuit arrangement can evaluate this sensor signal and perform adjustment of the electric grid potential dependent on this. In this case, the control signal can be for example a desired value for the first electric grid potential. A high level of reliability can be achieved by way of the series circuit because the desired function can be achieved with only a few electrical or electronic components. The focusing unit, in particular its control circuit, can be coupled for communication or signaling to the control unit and receive the at least one control signal from it.

The value for the first predefined grid potential can be provided by a higher-order controller of the X-ray device. This value can be dependent on an object to be examined, which is supplied with the X-ray radiation released by the X-ray tube.

Preferably, the focusing unit has a series resistor or shunt for electrical coupling to the energy converter. The series resistor can be said electrical resistor of the adjustable voltage regulator, which is wired in series for example to the transistor of the focusing unit. The series resistor can make it possible to bring the focusing unit into a predefinable defined operating state, so that accurate regulating of the electric grid potential of the grid electrode can be very reliably achieved.

The focusing unit therefore comprises at least the adjustable voltage divider and the control circuit adjusting the adjustable voltage divider for this purpose. As a rule, the focusing unit is at least partially galvanically coupled to electrical potentials of the X-ray tube. This applies in particular to the grid electrode, to which it is electrically coupled, to be able to adjust the desired electric grid potential.

The control circuit is preferably an electronic hardware circuit, which can have at least partially also a program-controlled computer unit. The control circuit provides the desired functionality in order to adjust the adjustable voltage divider in such a way that at least the first electric grid potential can be adjusted, preferably corresponding to the value for the first electric grid potential transmitted with the control signal. This adjusting can particularly preferably also comprise regulating, which can feature, for example, detecting of the electric grid potential. This detected grid potential can be compared with the predefined value for the first electric grid potential in accordance with the control signal. The adjustable voltage divider can then be adjusted dependent on the comparison. In principle, regulating-free control of the adjustable voltage divider can also be provided, however. In this case, the possibility can also be provided of achieving a regulating functionality by detecting the focus via a suitable sensor and a corresponding predefined comparative value, with the control signal then being ascertained dependent on this comparison. Further designs and combinations are conceivable.

The electric power of the energy converter is adjusted dependent on the predefined value for the first electric grid potential. The required electrical energy can be provided for the focusing unit thereby, so that it can achieve the required adjustment at the adjustable voltage divider and in particular can ensure that the electric grid potential at the grid electrode substantially matches the predefined value for the first electric grid potential. For this purpose it can be provided that the value for the first electric grid potential is evaluated by the control unit and a corresponding energy converter signal is provided, which can be used for adjusting the power to be converted of the energy converter. The energy converter is correspondingly designed so that it adjusts the converted power dependent on the energy converter signal.

Overall, one or more example embodiments of the present invention make it possible to significantly improve the function of the circuit arrangement and consequently also the function of the X-ray device, and, more precisely, in particular in relation to the focusing of the electron flow using electric fields caused by the at least one grid electrode. The laborious use of magnetic fields can be significantly reduced thereby if not completely avoided even.

It is also proposed that an electric power of the energy converter is also selected dependent on at least one electric power, an electrical voltage or an electrical current of the focusing unit, which the focusing unit requires for providing the first electric grid potential. A customized energy supply of the focusing unit can be achieved as a result. It has proven to be particularly advantageous if the electric power of the energy converter is selected dependent on the electrical current of the focusing unit. In particular an oversupply and/or an undersupply of the focusing unit with electrical energy can be largely avoided as a result. With mutually independent regulating operations for the adjustable voltage divider and the energy converter, the use of the adjustable voltage divider in particular can result, owing to positive feedback, for example in an upper voltage limit for the provision of the grid potential being attained, or an excessive power loss can occur particularly in the region of the adjustable voltage divider. Conversely, with an inadequate output voltage for the electrical potential of the grid electrode the situation can occur where the grid potential then no longer attains the predefined value. This problem can be reduced even more effectively with this development. Namely the current energy demand or the current power can be ascertained from the focusing unit-side variables, so that the energy converter can be controlled accordingly. A good, reliable coordination can be achieved between the energy supply of the focusing unit and the energy demand for normal operation as a result. The corresponding power demand of the focusing unit can be ascertained using data tables, measured values, the at least one predefined value of the first electric grid potential and/or the like.

According to one development it is proposed that the electric power of the energy converter is ascertained using a characteristic diagram. The energy converter is therefore not operated—as customary in the prior art—such that it provides an adjustably constant electrical voltage at the output side, but instead in such a way that, dependent on operation of the focusing unit, a desired value is inferred for the electrical voltage in particular provided by the energy converter, which, by taking into account a regulating reserve of the focusing unit, can provide for reliable operation of the focusing unit. This desired value can be inferred from the characteristic diagram, for example a characteristic curve or the like. The characteristic diagram can be in the form for example of a data file in which, dependent on a respective discrete operating state of the focusing unit, required operating values of the energy converter, for example the output voltage provided by the energy converter or the like are stored assigned. Overall, the management of the method according to one or more example embodiments of the present invention can be further improved thereby.

Furthermore, it is proposed that the electric power of the energy converter is ascertained, moreover, dependent on an adjustment reserve predefined for the adjustable voltage divider. The adjustment reserve serves to indicate an excess value of the electric power or electrical energy, which is to be provided in order to be able to adjust the adjustable voltage divider very dynamically in a customized manner without departing from the normal operating state of the adjustable voltage divider. This development takes into account the fact that the adjustable voltage divider can be adjusted at a very high speed with respect to adjusting of the energy converter. It is consequently possible to largely decouple the time constant in relation to adjusting the adjustable voltage divider from the time constant of the power adjustment of the energy converter. The adjustment reserve can be predefined as a percentage supplementary value or also as a tolerance band in relation to a predefined value.

Furthermore, it is proposed that the energy converter is operated in an operating mode in which the energy converter provides an adjustably constant electrical current at the focusing unit side. The positive feedback effect illustrated in the introduction can be better suppressed hereby. The operating mode can correspond to a current source mode in which the provided current is adjusted by the control unit. Good control-engineering decoupling from the function of the control circuit can be achieved as a result.

It is proposed, moreover, that the energy converter has a voltage transformer coupled to an electrical energy source, and an electrically isolating resonant converter, wherein the resonant converter is electrically coupled at the input side to the voltage transformer and at the output side at least to the focusing unit, wherein an input current of the resonant converter is adjusted dependent on the predefined value for the first electric grid potential. Focusing and/or pinching-off of the electron flow can be improved further as a result of this measure. The voltage transformer can be designed as a DC/DC converter. If necessary, the voltage transformer can be designed for example as a boost converter (booster) or also as a buck converter (buck). Combinations hereof are of course also conceivable, for example to be able to implement a wide input voltage range by way of the voltage transformer. Furthermore, sometimes a rectification can additionally also be provided at the input side to make an energy supply from an alternating current source—such as a public power grid—possible. The energy converter-side control or regulation is therefore no longer voltage-based, but advantageously at least partially current-based. For the purpose of control or regulation it can be provided that the input current of the resonant converter is detected by a suitable current sensor, which provides a corresponding current sensor signal for the control unit. The control unit can evaluate this current sensor signal and control the energy converter, and, more precisely, in particular the voltage transformer, accordingly. The resonant converter can, in principle, also be formed by a different electrically isolating energy converter.

The electrically isolating energy converter is supplied with electrical energy by the voltage transformer in that the voltage transformer provides a direct voltage for this. Both the voltage transformer and the electrically isolating energy converter are preferably controlled by the control unit. For example, the direct voltage provided by the voltage transformer can be adjusted, in particular regulated, via the control unit. For this, the provided direct voltage can be detected via a voltage sensor and a corresponding voltage signal transmitted to the control unit. The electrically isolating energy converter is preferably designed as an electrically isolating resonant converter. If the electrically isolating energy converter is formed by a resonant converter, at least some of a resonance inductance can be provided for this purpose by a transformer, which is designed as an isolating transformer. A resonance circuit is connected for example to at least one half-bridge circuit, by which the normal resonance mode can be achieved. The functions of the voltage transformer and of the electrically isolating energy converter, in particular of the resonant converter, are known to a person skilled in the art, for which reason further detailed explanations will be desisted from in the present case.

The combination of the voltage transformer with the resonant converter makes many different operating modes possible, which allow the function of the circuit arrangement to be adjusted in a customized manner for a respective specific operating situation. It is thus for example possible to control one of the respective transformers not only in respect of the provided voltage but also in respect of the provided current. This can be achieved for example with the aid of the control unit.

Furthermore, it is proposed that a minimum current value and a maximum current value is predefined for the input current, the input current is detected and compared with at least the minimum or the maximum current value, and the electrical voltage provided by the voltage transformer for the resonant converter is adjusted dependent on the comparison. This development makes it possible to implement a tolerance band regulation. The deviation of the minimum current value or of the maximum current value from a predefined mean value can be selected to be identical for the minimum current value and the maximum current value. Of course the present invention is not limited to this and different differences from the mean value can also be provided. This design makes it possible, moreover, to implement a tolerance band regulation. Should an inadequate supply voltage be provided for the focusing unit, in particular for the adjustable voltage divider, the current through the voltage divider could be zero. The input current of the resonant converter would also be zero thereby. The cascaded regulating can, however, accordingly be performed such that the electrical voltage provided by the voltage transformer is increased. It is therefore no longer regulated to the electrical voltage provided by the voltage transformer but instead to the electrical current. If, by contrast, under the effect of the above-described positive feedback, the electrical voltage and therewith also the input current is increased, the maximum input current would be limited correspondingly by the cascaded regulation. Overall, reliable regulation or control can be achieved hereby with little effort.

It is also proposed that a frequency of the control signal depends on the predefined value for the first electric grid potential and the control circuit ascertains the predefined value for the first electric grid potential from the frequency of the control signal. The value for the first electric grid potential can be easily transmitted from the control unit to the control circuit by way of this design, so the control circuit can adjust the adjustable voltage divider accordingly. In this case, the control signal is preferably an electrical alternating voltage signal whose frequency can be adjusted by the control unit. Because the control signal is an alternating voltage signal, it can be transmitted via an electrically isolating transformer in an electrically isolated manner to the control circuit or the focusing unit. It is easily possible to be able to adjust the electric grid potential in accordance with the predefined value for the first electric grid potential as a result.

Furthermore, it is proposed that the focusing unit is deactivated with a predefined, in particular a predefined minimum or maximum, frequency. Deactivating the focusing unit comprises in particular at least the state that the grid potential is negative with respect to an electrical potential of the cathode electrode such that the electron flow is pinched-off. Substantially no X-ray radiation is emitted in this operating state of the X-ray tube. For this purpose it can be provided that in addition to the focusing unit, a switching unit is provided, which, just like the focusing unit, is supplied with electrical energy by the energy converter. For example, it can be provided that the switching unit and the focusing unit are wired in series to be able to achieve the desired functionality. For example, it can also be provided that with a frequency of the control signal, which is less than the predefined minimum frequency, the switching unit makes deactivating of the focusing unit possible and supplies the grid electrode with an electric grid potential as illustrated previously. In principle, something comparable can be provided in a dual manner also for a maximum frequency. A control characteristic can be provided inverted for example for this purpose. Of course this grid potential can also be achieved by the interaction of the focusing unit with the switching unit. The switching unit can also be at least partially incorporated by the focusing unit. Overall, operation of the X-ray tube can be improved further.

In accordance with one development, it is proposed that with a predefined, in particular a predefined minimum or maximum, frequency, the focusing unit is controlled in such a way that both switching unit and the transistor are operated in the switched-on switching state to provide a grid short-circuit. A third operating state can be achieved in which the grid electrode can be short-circuited as a result. Pinching-off of the electron flow and focusing of the electron flow can be deactivated as a result. The transistor is preferably operated in a switching mode for this, which differs from a linear mode.

It is also proposed that an output current of the voltage transformer is adjusted dependent on the predefined value for the first electric grid potential. This development uses operation of the energy converter using a current source characteristic. This can be separately adjusted in particular for the focusing mode. By contrast, the energy converter can be conventionally controlled, in particular by providing a predefined electrical voltage, outside of the focusing operation. Furthermore, there is of course the possibility of changing a clock frequency of the resonant converter in order to operate the resonant converter, in particular if it is an LLCC resonant converter, in the corresponding resonance. At this resonance frequency an output current is, as a rule, determined independently of load, in particular substantially only by an oscillating circuit inductance and the input voltage of the resonant converter. As a result, both the voltage transformer and the resonant converter can be operated in a controlled manner because, as a consequence of the current source characteristic, as a rule, a suitable, sufficiently large output voltage is always established for the focusing unit. An adequate regulating reserve up to a maximum load can also be achieved for the adjustable voltage divider as a result.

It is proposed, moreover, that the resonant converter has a full bridge circuit having two half-bridge circuits, wherein during the focusing operation, at least temporarily, one of the two half-bridge circuits is activated and the other of the two half-bridge circuits is deactivated. For example a transformer primary voltage can be substantially halved thereby, and this is particularly advantageous in relation to the much lower focusing voltage. Deactivating a half-bridge circuit means, in particular, that this half-bridge circuit is not actively involved in the energy conversion. Preferably, it is completely switched-off. It can be provided, however, that the deactivated half-bridge circuit provides for example a current path for a free-wheeling current or the like, but without intervening with clocks here. This means, switching elements of this deactivated half-bridge circuit are not supplied with corresponding switching signals.

The half-bridge circuits have in each case two switching elements, in particular semiconductor switches, wired in series, by which the electrical direct voltage provided by the voltage transformer can be converted into an electrical alternating voltage. A switching topology of this kind is also referred to as a full bridge circuit. The half-bridge circuits are wired in parallel at the ends and are operated in phase opposition.

A semiconductor switch within the meaning of this disclosure is a preferably controllable electronic switching element, for example a transistor, a thyristor, combination circuits hereof, in particular with free-wheeling diodes wired in parallel, for example a Metal Oxide Semiconductor Field Effect Transistor (MOSFET), an Isolated Gate Bipolar Transistor (IGBT), preferably with integrated free-wheeling diodes, or the like.

The middle terminal of a half-bridge circuit is a terminal, which is electrically conductively connected to the connection point of the in semiconductor wired in series. In inverter mode, conventionally the converted alternating voltage is provided at this middle terminal.

The switching mode of the semiconductor switch in the form of a transistor, transistor circuit, transistor means, or the like, that in a switched-on state, between the terminals forming the switching path a very low electrical resistance is provided, so that a high current flow is possible with a very low residual voltage. In the switched-off state the switching path of the semiconductor switch is highly resistive, this means it provides a high electrical resistance so that, even with a high voltage applied to the switching path, substantially no or only a very low, in particular negligible, current flow is present. The situation in linear mode is different.

Furthermore, it is proposed that the circuit arrangement has a switching unit, which is designed to supply the at least one grid electrode in a first switching state with the first electric grid potential focusing the electron flow and in a second switching state, with a second electric grid potential for pinching-off the electron flow between the anode electrode and the cathode electrode. This development is based, inter alia, on the idea that it is possible, by way of a suitable combination of the switching unit with the focusing unit, to create the possibility of switching over the grid-cathode voltage or the electric grid potential of the grid electrode quickly from a pinch-off voltage or a pinch-off potential to a predefinable focusing voltage or a predefinable focusing potential, and/or vice versa. The focusing unit can additionally be used to transfer or discharge the parasitic electrical capacitance of the connecting cable and/or grid electrode. Due to the active transferring of the grid capacitance or grid-cathode capacitance and the capacitance of the connecting cable by the switching unit and the focusing unit, a time constant can be reduced with a change from pinching-off of the electron flow to focusing of the electron flow or, vice versa, and therewith an influence of the switch change on properties of the focus can be reduced. Furthermore, it is possible, in particular in relation to a regulation of the grid-cathode voltage or of the grid potential, to couple the focusing unit to an electrical potential of the cathode electrode, whereby more accurate focusing of the electron flow in the X-ray tube can be achieved. Furthermore, this development makes it possible to easily integrate the circuit arrangement in an X-ray device. Assembly space and costs can be saved by way of the circuit arrangement according to one or more example embodiments of the present invention.

The switching unit could, in principle, have one or more suitable electromechanical switching element(s) in order to achieve the desired switching function. As a rule, the switching unit has, inter alia, for example for reasons of switching speed, one or more electronic switching element(s), however, in particular semiconductor switching elements, by which the desired switching function of the switching unit can be achieved. The switching elements can be formed for example by transistors, thyristors, combinations hereof and/or the like. For the envisaged application it can particularly advantageously be provided that a plurality of electronic switching elements are substantially synchronously operated wired in series. Operation with an operating voltage, which is much greater than the maximum permissible one, of a respective switching element can be achieved as a result, even with electronic switching elements, which are designed only for some of the voltage that occurs. The switching unit provides at least one first switching state at which the grid electrode is supplied with the first electric grid potential releasing the electron flow, and, more precisely, preferably the grid potential, which is provided by the focusing unit. In a second switching state of the switching unit the at least one grid electrode can be supplied with a second electric grid potential for pinching-off the electron flow between the anode electrode and the cathode electrode. For this purpose the switching unit can be electrically coupled to the energy converter, with the switching unit coupling the energy converter to the X-ray tube in such a way that the energy converter provides at least the pinch-off voltage between the grid electrode and the cathode electrode. This can be achieved by the series connection of the switching unit with the focusing unit.

Because the switching unit and the focusing unit are preferably wired in series, at least the second electric grid potential can be provided by the focusing unit. The focusing unit can assist a respective switch change of the switching unit as a result, whereby the functionality can be achieved more reliably.

A grid-cathode voltage in a range from approximately zero to approximately 500 V can be provided for focusing. This voltage can likewise be provided by the energy converter acting as an operating voltage source. For this purpose the focusing unit can adjust the voltage provided by the energy converter accordingly for example.

The control circuit is preferably connected to the at least one switching element, in particular to the at least one semiconductor switching element, of the switching unit. The switching unit does not need to have a separate communications interface, by which it has a communications link to the control unit. A switch change of the switching unit can also be controlled via the control circuit as a result.

The control unit can assume or provide further functions, in particular in relation to the focusing voltage, the pinch-off voltage, providing an operating voltage by way of the energy converter and/or the like. The control unit can be designed to be electrically isolated from the circuit arrangement and is preferably connected thereto in an electrically isolated manner. The control unit itself can be provided as a separate unit. Preferably however it is a component part of the circuit arrangement and particularly preferably arranged integrated therein.

It is also proposed that at least two of the said three operating states are at least partially statically provided. This makes a particularly fast change between two successive operating states possible. This development proves to be particularly advantageous if a change is to me made between the focusing operating state and the pinching-off operating state. The problems that occur in the prior art in relation to an undefined focus of the electron flow during the change can be largely reduced if not completely avoided even.

The advantages and effects disclosed for the method according to one or more example embodiments of the present invention apply equally to the circuit arrangement according to one or more example embodiments of the present invention and the X-ray device equipped with the circuit arrangement according to one or more example embodiments of the present invention, and vice versa. Features worded in terms of the method can therefore also be worded in terms of the apparatus, and vice versa.

The exemplary embodiments illustrated below are preferred embodiments of the invention. The features, combinations of features disclosed previously in the description and the features and combinations of features mentioned in the following description of exemplary embodiments and/or shown solely in the figures can be used not only in the combination disclosed in each case, but also in other combinations. Embodiments of the invention, which are not explicitly shown in the figures and illustrated, but emerge and can be generated from the embodiments illustrated by way of separate combinations of features, should therefore also be regarded as being incorporated or as disclosed. The features, functions and/or effects represented on the basis of the exemplary embodiments can, when taken alone, in each case represent individual, features, functions and/or effects of the present invention to be regarded independently of each other, which in each case also develop the present invention independently of each other. The exemplary embodiments are therefore intended to also incorporate combinations other than those in the embodiments illustrated. Furthermore, the described embodiments can also be supplemented by further features, functions and/or effects of the present invention already described.

DETAILED DESCRIPTION

Figure 1:
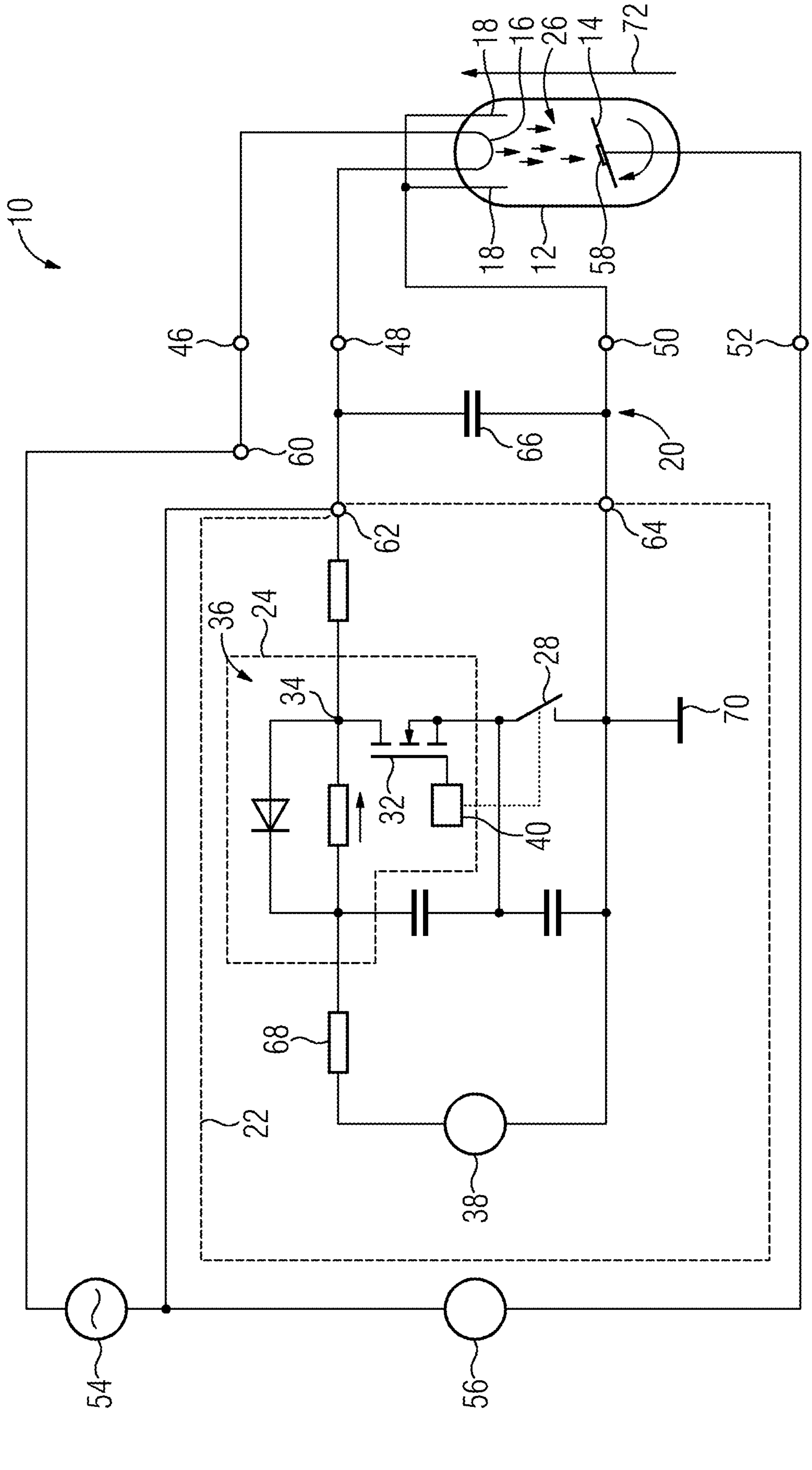
FIG. 1 shows a schematic circuit diagram representation of an X-ray device with an X-ray tube connected to a circuit arrangement, with a detail of a grid actuation of the X-ray tube of the circuit arrangement being illustrated.

FIG. 1 shows in a schematic circuit diagram representation a detail of an X-ray device 10 with an X-ray tube 12, which has an anode electrode 14 and a cathode electrode 16, which are arranged in an evacuated vessel. Arranged between the anode electrode 14 and the cathode electrode 16 is a grid electrode 18. The anode electrode 14 is electrically connected to a terminal 52, the grid electrode to a terminal 50 and the cathode electrode 16 to two terminals 46, 48. For heating purposes the cathode electrode 16 has two terminals, namely the terminals 46 and 48, via which the cathode electrode 16 can be electrically supplied with energy in order to heat the cathode electrode 16 during normal operation to a predefinable temperature so the desired electron emission can be achieved. For this purpose the terminals 46, 48 are electrically connected to an electrical heat energy source 54.

The terminals 48, 52 are also electrically connected to a voltage source 56, which provides an anode-cathode voltage 72, which is substantially also applied between the cathode electrode 16 and the anode electrode 14. An anode potential of the anode electrode 14 is, as a rule, greater than a cathode potential of the cathode electrode 16.

Dependent on an electric grid potential at the grid electrode 18, electrons issuing from a cathode material of the cathode electrode 16, forming an electron flow 26, are accelerated to the anode electrode 14. When the electrons impinge on the anode electrode 14, which, as a rule, is designed as a rotating electrode, X-ray radiation is generated and emitted by the X-ray tube 12.

The function of the X-ray tube 12 can be influenced by the grid potential at the grid electrode 18. On the one hand it is therefore possible to supply the grid electrode 18 with a second electric grid potential with which a pinching-off of the electron flow 26 between the anode electrode 14 and the cathode electrode 16 can be achieved. The second electric grid potential is also referred to as a pinch-off potential. A grid-cathode voltage correspondingly results, which is accordingly referred to as a pinch-off voltage. With X-ray tubes, the pinch-off voltage can lie, for example, in a range from approximately zero to approximately 4 kV. In the present embodiment the pinch-off voltage lies at more than approximately 500 V, for example approximately 3.5 kV or even higher. A transition region between focusing and pinching-off is undesirable because it can result in an undefined focus and in an undefined electron flow in the X-ray tube 12.

As a rule, the grid potential, at least for the pinching-off of the electron flow 26, is negative with respect to the cathode potential of the cathode electrode 16.

The second electric grid potential is, as a rule, selected such that a safe, reliable pinching-off of the electron flow 26 can be achieved without damaging an electrical isolation in the X-ray device 10. In many cases the maximum admissible grid-cathode voltage is approximately 4 kV, for which reason the X-ray device 10 with its components is designed accordingly for this voltage.

Substantially no X-ray radiation is generated during pinching-off of the electron flow 26 because the electron flow 26 is substantially suppressed.

Furthermore, the grid electrode 18 can be supplied with a first electric grid potential, which allows a release, in particular focusing, of the electron flow 26. A corresponding grid-cathode voltage is also referred to as a focusing voltage. With the focusing voltage, it is possible to release not only the electron flow 26, preferably in a controlled manner, but, at the same time to also control focusing of the electron flow 26 in relation to impinging on the anode electrode 14. A focus 58 on the anode electrode 14 can be achieved, for example in a predefinable manner as a result. The generation of X-ray radiation can be influenced over a wide range as a result.

A first terminal is connected to a connecting cable 20 at the electrical terminals 46, 48, 50. An opposing terminal of the connecting cable 20 is connected to electrical terminals 60, 62, 64. The connecting cable 20 comprises in particular the high-voltage cable of the cable capacitance 66 influencing the grid voltage. In the present case, the electrical terminals 46, 48, 50, 52 are the tube-side terminals. The electrical terminals 60, 62, 64 are the generator-side terminals.

The heat energy source 54 is connected to the electrical terminals 60, 62. Connected to the electrical terminals 62, 64 is a circuit arrangement 22 by which the electric grid potential for the grid electrode 18 can be provided in a predefinable manner. FIG. 1 illustrates only a detail of the circuit arrangement 22. A schematic block diagram representation of the circuit arrangement 22 can be found in FIGS. 2 to 4 still illustrated below.

Furthermore, it can be seen from FIG. 1 that the connecting cable 20 has a cable capacitance, which is symbolically represented in FIG. 1 by a capacitor 66. The capacitor 66 also comprises a grid-cathode capacitance of the X-ray tube 12, although this is not represented further in FIG. 1. The capacitor 66 depends, inter alia, on a length of the cable and can have for example a capacitance value of approximately 4 nF. This is relevant for controlling the X-ray tube in relation to the pinching-off of the electron flow 26 and focusing of the electron flow 26 only by way of the grid electrode 18, as will be illustrated below.

In the present case, a grid-cathode voltage of approximately zero to approximately 500 V is required for focusing. Depending on the construction of the X-ray tube 12, this voltage can also be different, just like the pinch-off voltage.

For providing the grid potential the circuit arrangement 22 has an energy supply, which will be illustrated in more detail below and is designated in FIG. 1 only schematically by 38. The energy supply 38 has an internal resistance 68, via which elements and assemblies of the circuit arrangement 22 are supplied with electrical energy for normal operation.

The circuit arrangement 22 also has a focusing unit 24, which is wired in series with a switching unit 28. This series circuit comprising the focusing unit 24 and the switching unit 28 is connected by the internal resistance 68 to the energy supply 38 and is supplied by it with an operating voltage.

In the present case, the switching unit 28 provides two switching states, namely a switched-on switching state as a first switching state and a switched-off switching state as a second switching state. The switched-on switching state corresponds to the focusing function and corresponds to the first operating state of the above description. In the switched-on switching state the operating voltage is substantially applied to the focusing unit 24. The focusing unit 24 provides, as will be illustrated below, a grid-cathode voltage, which allows the electron flow 26 to be focused in a predefinable manner.

In the second switching state of the switching unit 28, in which the switching unit 28 is in the switched-off switching state, the focusing unit 24 is substantially deactivated, so that approximately the operating voltage of the energy supply 38 is provided between the grid electrode 18 and the cathode electrode 16. It should be noted in this connection that substantially no electrical current flows in this operating state, at least in a steady state. If, therefore, the operating voltage is approximately 3.5 kV, this operating voltage, in the switched-off switching state of the switching unit 28, is also applied between the grid electrode 18 and the cathode electrode 16. In the present case, this voltage is negative in relation to the cathode electrode 16 so the grid potential is less than the cathode potential. In this switching state a pinching-off of the electron flow 26 is achieved therefore, so that substantially no electrons reach the anode electrode 14 anymore and therefore the generation of X-ray radiation is substantially interrupted.

In the first switching state of the switching unit 28, namely the switched-on switching state, the focusing unit 24 is supplied with the operating voltage. The focusing unit 24 then provides a corresponding first electric grid potential so not only is the electron flow 26 released, but a corresponding predefinable focusing of the electron flow 26 can also be achieved on striking the anode electrode 14.

For this purpose the focusing unit 24 comprises at least one series circuit comprising an electrical resistor 30, which can simultaneously serve as a series resistor in relation to connection of the energy supply 38, and a transistor 32, which in the present case is formed by a field effect transistor, and, more precisely, a self-locking re-channel MOSFET. An adjustable voltage divider is provided as a result. Depending on the embodiment, a different transistor can also be used here, however, in particular also a bipolar transistor.

In the present case, the transistor 32 has a gate terminal, which is not designated, and which is connected to a control circuit 40, schematically indicated in FIG. 1, which supplies the gate terminal with a predefinable electrical gate potential, so that at a central terminal 34 of this series circuit substantially the electric grid potential can be provided for a first electric grid potential in accordance with a predefinable value. For this purpose the transistor 32 is operated in a linear mode, so that the respective grid potential can be established at the central terminal 34 dependent on the respective adjustment of the gate potential at the transistor 32. As can be seen from the representation in FIG. 1, the focusing unit 24 is activated by the switching-on of the switching unit 28 and deactivated by the switching-off. In the deactivated operating state of the focusing unit 24 the pinch-off potential consequently corresponds to a predefinable value for a second electric grid potential.

Figure 2:
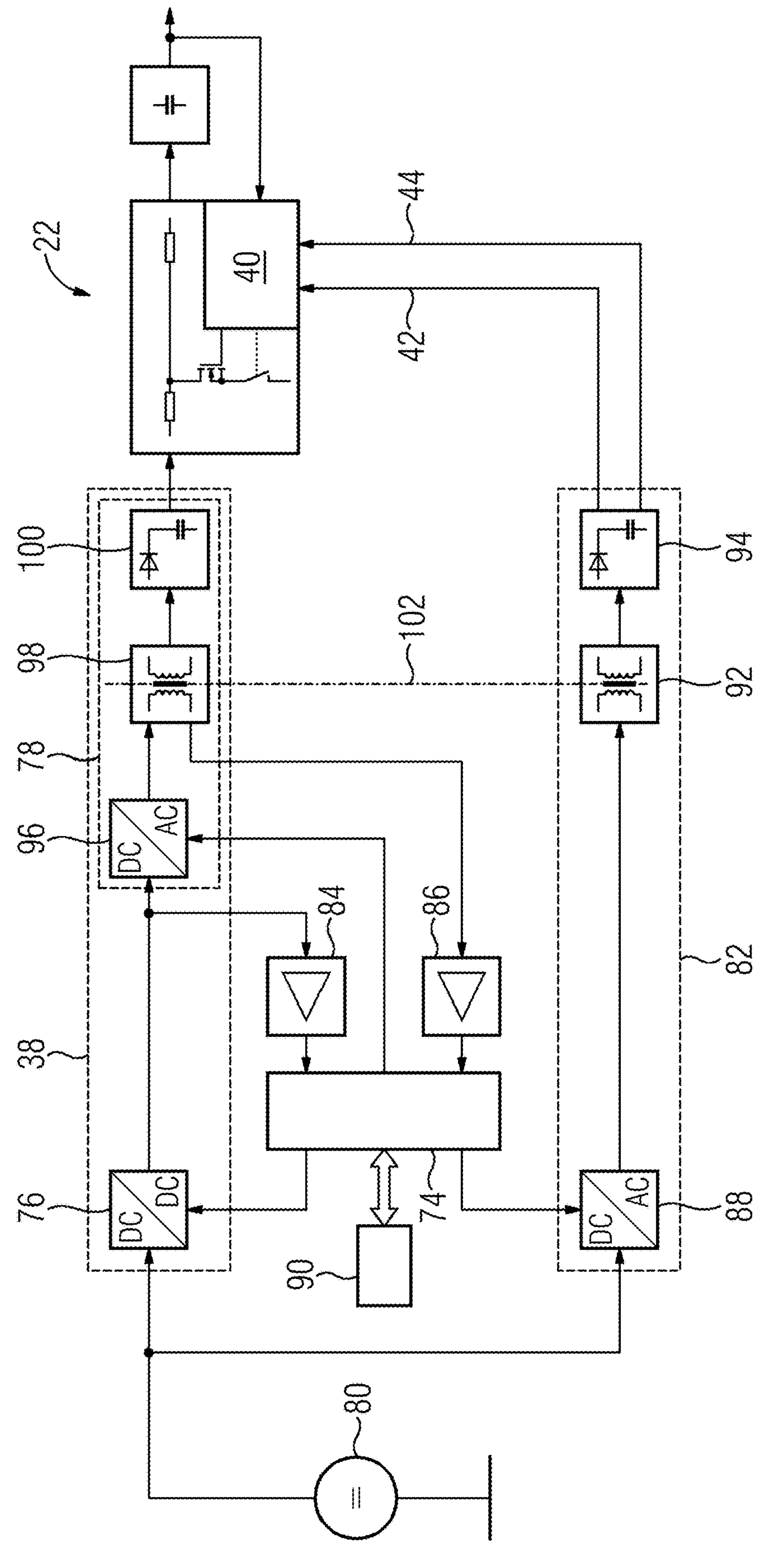
FIG. 2 shows a schematic block diagram representation of the circuit arrangement, including the detail in FIG. 1.

FIG. 2 shows the circuit arrangement 22 now in a schematic block diagram representation. From FIG. 2 it can be seen that, apart from the elements and assemblies already illustrated on the basis of FIG. 1, the circuit arrangement 22 also comprises the energy converter 38, which serves as the energy supply in particular for the focusing unit 24. For this purpose the energy converter 38 is designed as an electrically isolated energy converter to be able to supply the focusing unit 24 and the switching unit 28 electrically coupled to the grid potential and the cathode potential of the X-ray tube 12 with energy. For this purpose the energy converter 38 is connected to a direct voltage source 80. The direct voltage source 80 can for its part be supplied with electrical energy from a public power grid.

The energy converter 38 is connected to a control unit 74, which provides corresponding control signals for normal operation of the energy converter 38. The control unit 74 is also coupled for communication to a higher-order controller 90, via which operating values, in particular a value for the first electric grid potential, can be predefined.

Furthermore, an auxiliary converter 82 is provided, which is likewise supplied with electrical energy by the direct voltage source 80. The auxiliary converter 82 is likewise connected to the control unit 74 and is also supplied by it with corresponding (non-designated) control signals for normal operation. The auxiliary converter 82 serves to provide two control signals 42, 44 in an electrically isolated manner, which signals serve to control the control circuit 40. One of the control signals 42 serves to supply the control circuit 40 with electrical energy, whereas a second one of the control signals, and, more precisely, the control signal 44, serves to control at least one operating value for the control circuit 40 and the units controlled by the control circuit 40, namely the focusing unit 24 and the switching unit 28. This will be illustrated in more detail below.

In the present case, the energy converter 38 has a voltage transformer 76, which is electrically connected at the input side to the direct voltage source 80. At the output side a resonant converter 78 is connected to the voltage transformer 76 and provides an electrical energy supply for the focusing unit 24 and the switching unit 28 in an electrically isolated manner. For this purpose the resonant converter 38 has an inverter 96, which is in the present case is formed from two half-bridge circuits, which operate a resonance circuit whose inductance is formed at least partially by a primary side of a transformer 98 designed as an isolating transformer. At the secondary side the transformer 98 is connected to a rectifier 100, which provides a corresponding direct voltage for the focusing unit 24 and the switching unit 28. A voltage detection unit 84 detects the converted voltage provided by the voltage transformer 76 and supplies a corresponding voltage signal to the control unit 74. The control unit 74 supplies corresponding control signals likewise for the inverter 96, so that the desired converter mode of the resonant converter 78 can be achieved.

The transformer 98 also comprises an auxiliary winding (not represented further), which is connected to a transformer detection unit 86, which supplies a corresponding transformer signal to the control unit 74.

In the present case, the auxiliary converter 82 comprises an auxiliary inverter 88 connected to the direct voltage source 80, and an auxiliary transformer 92 connected to the auxiliary inverter 88. The auxiliary transformer 92 is likewise designed as an isolating transformer and connected by its primary winding to the auxiliary inverter 88. A secondary winding of the auxiliary transformer 92 is connected to a rectifier 94, which provides the control signals 42, 44 for the control circuit 40. As already illustrated, the control signal 42 series to supply the control circuit 40 with energy, whereas the control signal 44 supplies corresponding control values, for example a predefined value for the first electric grid potential of the grid electrode 18. In the present case, it is provided that the predefined value for the first electric grid potential is dependent on the frequency of the control signal 44. As long as the frequency of the control signal 44 is greater than a predefined minimum frequency value, the switching unit 28 is switched by the control circuit 40 in the switched-on switching state. At the same time the transistor 32 is adjusted in respect of its electrical conductivity by the control circuit 40 dependent on the frequency, so that a grid-cathode voltage is supplied at the terminals 62, 64 in accordance with the value for the first electric grid potential. The auxiliary inverter 88 is therefore controlled by the control unit 74 accordingly, so that the corresponding control signals 42, 44 can be provided via the rectifier 94. The auxiliary converter 82 therefore serves not only as an energy converter for the control circuit 40, and therewith in particular for the focusing unit, which provides a free from potential energy supply, but the auxiliary converter 82 simultaneously also still serves as an electrically isolating signal transmitter. A signal functionality for transmission of data or signals can therefore simultaneously be achieved by way of the type of control of the auxiliary inverter 88 by the control unit 74, for example by applying a suitable modulation, whereby data or signals can be transmitted in accordance with the control signal 44. The control unit 74 is isolated in terms of electrical potential from the control circuit 40, in particular the focusing unit, as a result. At the same time a control signal can be transmitted to the control circuit 40 with potential isolation. The control signal 42 is consequently an energy signal here, which serves substantially to supply the control circuit 40 with energy.

FIG. 2 represents an electrical potential isolation 102, which is implemented by the transformers 92, 98. Inter alia, the control unit 74 is electrically isolated from the X-ray tube 12 as a result.

In the present case, the resonant converter 78 is designed as an LLCC resonant converter. In alternative embodiments a different type of resonant converter or an electrically isolating energy converter can of course also be provided here. The present invention is not limited hereto.

FIG. 2 shows the circuit arrangement 22, including the detail in FIG. 1. The control circuit 40 receives a desired value for the grid potential and a switching state for the switching unit 28 from the control unit 74. In the present case, the units are operated independently of each other. Both achieve a corresponding regulating functionality. The control unit 74 controls or regulates the energy converter 38, with the control unit 74 receiving corresponding control commands and data from a higher-order controller 90. In the present case, a communications link between the higher-order controller 90 and the control unit 74 is designed as a unidirectional communications link. However, the present invention does not need to be limited to this. Instead, the communications link can also be bidirectional.

The control circuit 40 assumes the functionality of adjusting the adjustable voltage divider 36, and actuates the transistor 32 accordingly. The corresponding desired values and switching states are transmitted from the control unit 74 to the control circuit 40 via the auxiliary converter 82. Basically, two operating states can be differentiated in this connection, and, more precisely, in the present case a first operating state in which the switching unit 28 is in the switched-on switching state, and therewith the circuit arrangement 22 in a focusing mode, in which by the focusing unit 24 the grid potential of the grid electrode 18 is adjusted in accordance with the predefined value for the first electric grid potential, which has been transmitted as the desired value from the control unit 74 to the control circuit 40. The control circuit 40 provides a regulating functionality in this regard and adjusts the grid potential of the grid electrode 18 accordingly. At the same time, in the present embodiment the grid potential also serves as an electric reference potential of the focusing unit. In alternative embodiments this can vary and for example the cathode potential can also be selected as an electric reference potential. The function of the present invention is independent of this, however.

In a second operating state, also referred to as grid blocking, the switching unit 28 is switched by the control circuit 40 into the switched-off switching state, so that the grid electrode 18 is supplied with the pinch-off potential. These operating states are adjusted by the control circuit 40 via the control signal 44.

Figure 3:
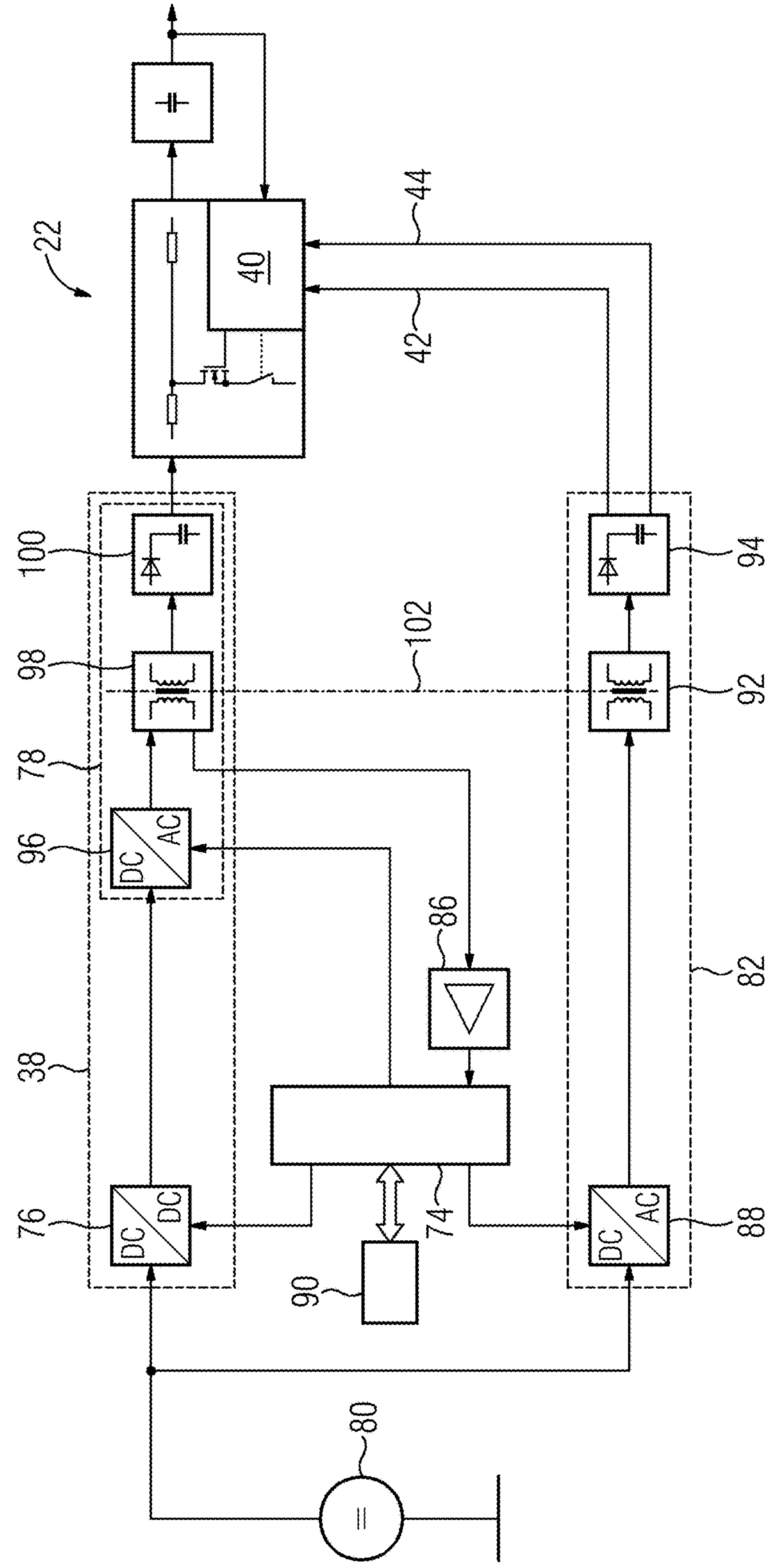
FIG. 3 shows a schematic block diagram representation of the circuit arrangement in FIG. 2 in a first operating state.
Figure 4:
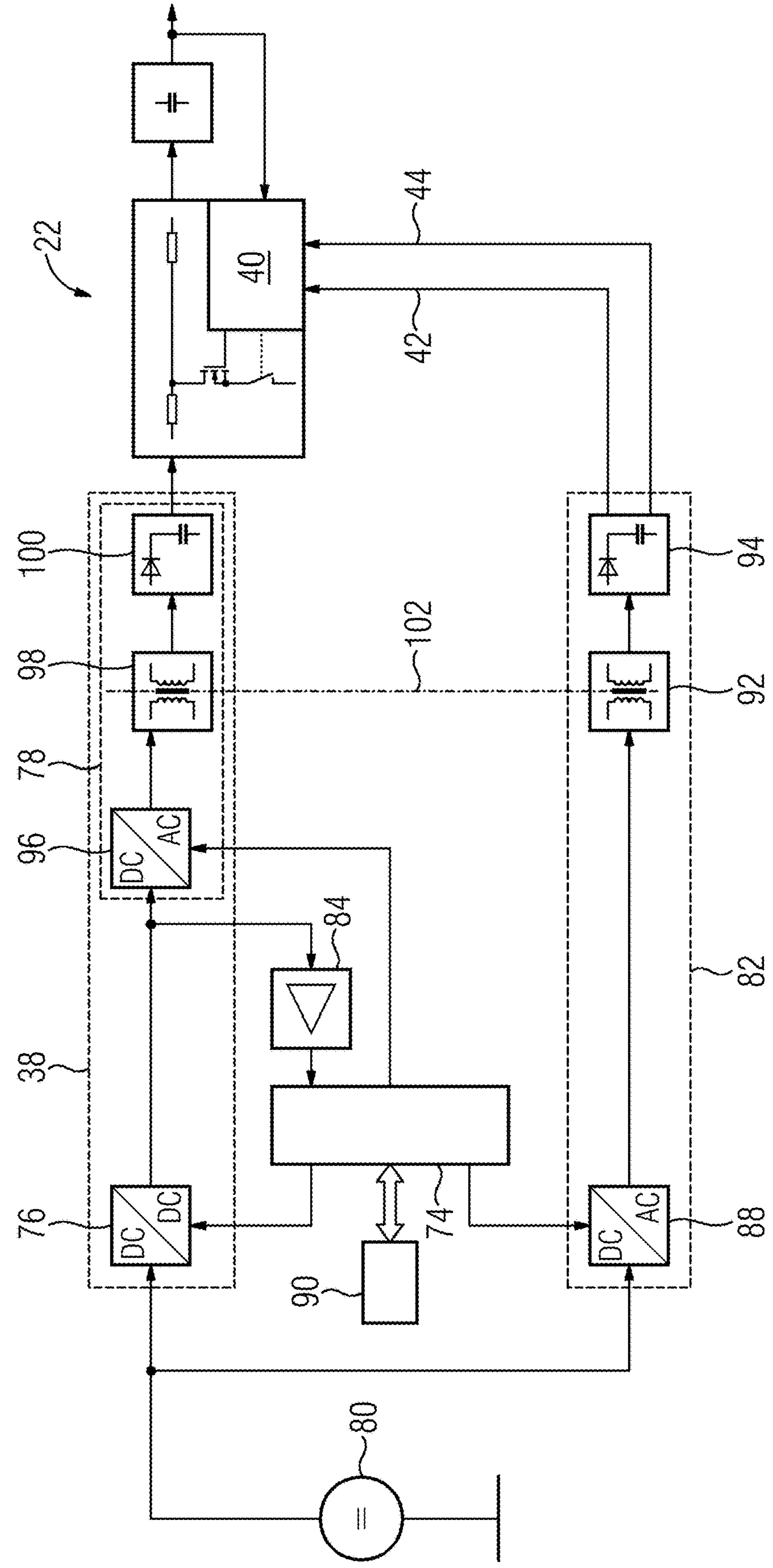
FIG. 4 shows a schematic block diagram representation of the circuit arrangement in FIG. 2 in a first operating state.

In the second operating state, as is also represented on the basis of FIG. 3, the focusing unit 24 is deactivated and the switching unit 28 in the switched-off switching state. There is no influencing of the grid potential at the high-voltage side. In this operating state the grid-cathode voltage is dependent on the voltage provided by the energy converter 38, which is dependent on the output voltage of the voltage transformer 76. The voltage transformer 76 can be operated in an unregulated manner in this operating state. Regulation can take place, by contrast, by taking into account the voltage provided by the auxiliary winding of the transformer 98 via the transformer detection unit 86. This variable can provide an actual variable, which is compared with a manipulated variable, which is provided by the output voltage of the voltage transformer 76.

In this operating state, the resonant converter 78 is operated at a fixed frequency in the LLCC-operating point with a voltage-inflexible output. The actual value for regulating the electric grid potential in this operating state is acquired via the measurement of the voltage at a at the primary-side auxiliary winding of the transformer 98. The grid-cathode voltage can be mapped with the aid of an evaluation by the magnetic coupling between the secondary winding of the transformer 98 and the auxiliary winding. It is thus possible to regulate the grid-cathode voltage at the primary side without a direct electrical coupling to the high-voltage side.

The situation differs in the focusing mode or in the first operating state in that now the adjustable voltage divider 36 loads the transformer 98 at the secondary side. As already illustrated, the electric grid potential is regulated via the adjustable voltage divider 36 in that the current is changed through the adjustable voltage divider 36 by the transistor 32 by changing its electrical conductivity. With an increase in current, voltage drop increases at the electrical resistor 30 and at the internal resistor 68. The greater this voltage drop becomes, the lower the grid-cathode voltage becomes at the output of the adjustable voltage divider or at the central terminal 34. Since the auxiliary winding approximately maps the secondary-side voltage of the energy converter 38, the electrical voltage detected in the process consequently sinks. This is corrected using the control unit 74, where the voltage provided by the energy converter 38 increases again. The control circuit 40 will react by way of corresponding control of the transistor 32 in order to correct the increased voltage. This produces undesirable positive feedback, which can result not only in a high power loss, in particular in the adjustable voltage divider 36, but also in overloading through to failure of a component. The same can also occur with an inverse regulating situation.

Figure 5:
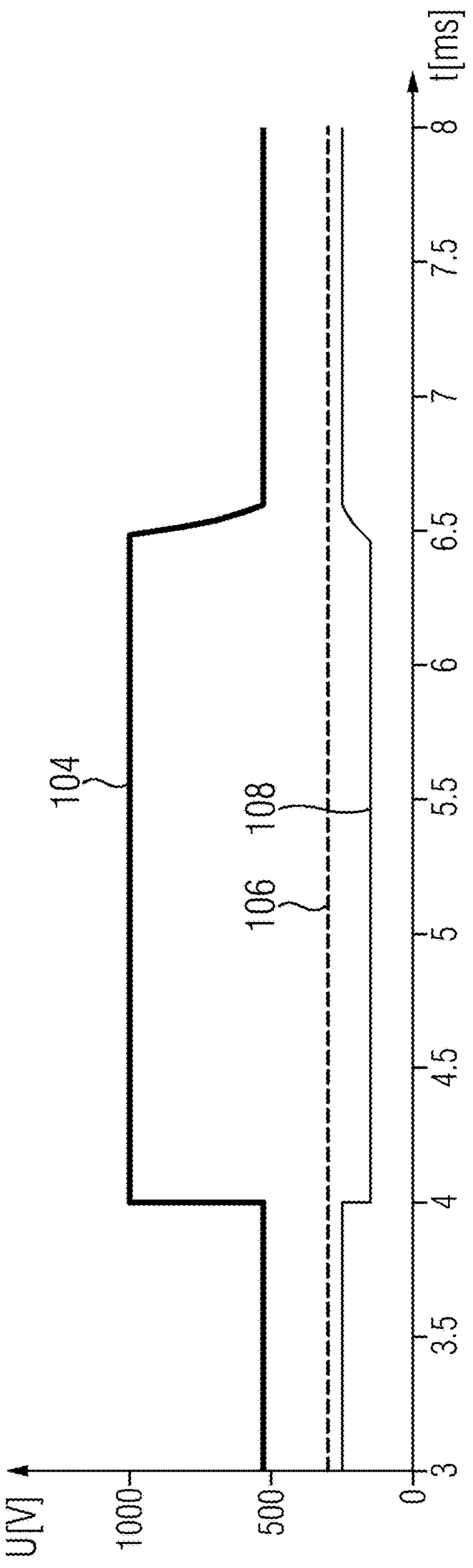
FIG. 5 shows a schematic graph representation of electrical voltages of the circuit arrangement in the first operating state.
Figure 6:
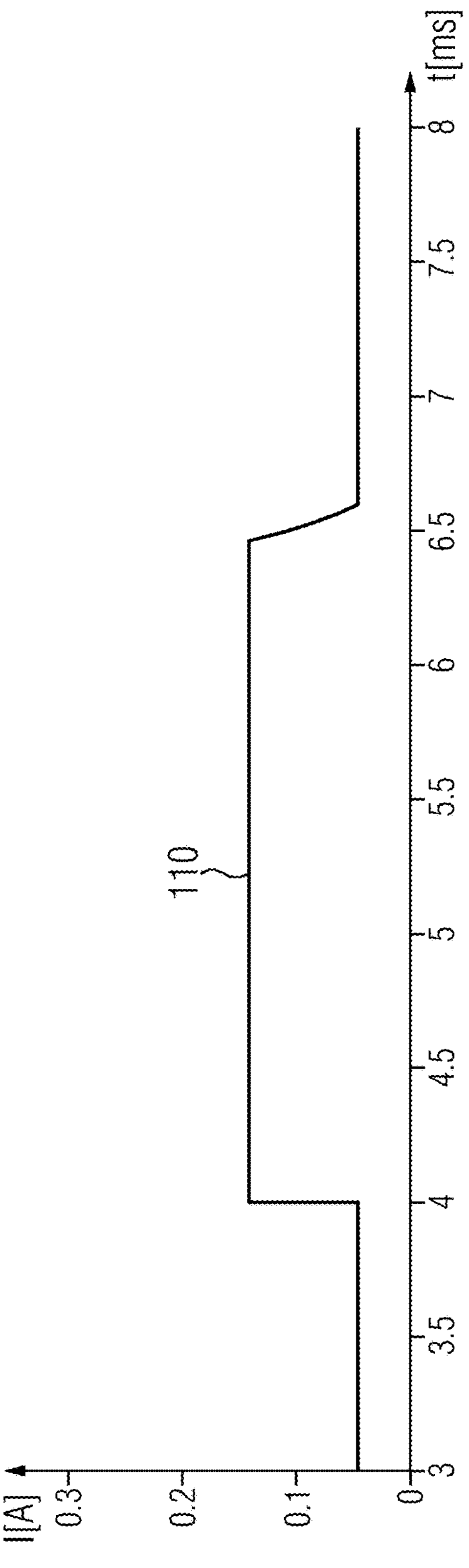
FIG. 6 shows a schematic graph representation of a supply current in the first operating state provided by an energy converter of the circuit arrangement in FIG. 2.

This behavior is schematically shown by the schematic graphs in FIGS. 5 and 6. FIG. 5 shows a schematic graph representation of electrical voltages of the circuit arrangement 22 in this first operating state, whereas FIG. 6 shows a corresponding schematic graph representation of a supply section of the detail of the circuit arrangement 22 represented in FIG. 1 in the first operating state. In FIG. 5 the ordinate is assigned to the electrical voltage and the abscissa is assigned to the time. In FIG. 6 the ordinate is assigned to the electrical current and the abscissa to the time. The time axes of FIGS. 5 and 6 correspond to each other. FIG. 5 and FIG. 6 belong together.

FIG. 5 shows voltage characteristics, whereas FIG. 6 shows correspondingly associated current characteristics. An embodiment of the present invention is not applied here. The output voltage of the transformer 98 is regulated (graph 106), and, more precisely, at the element with reference character 68 in FIG. 1. In the present case, this is the leakage inductance with a wire resistance of the transformer 98 (FIG. 2). A desired value of the grid voltage is reduced. The regulating unit in FIG. 1 increases the current through transistor 32 in FIG. 1 as a result in order to increase the voltage drop at the element 68. From this it follows that the input current increases (FIG. 6). The input voltage of the transformer 98 increases (corresponds to transformed voltage or reference character 38 in FIG. 1) as a result, whereby positive feedback is produced.

As can be seen from FIGS. 5 and 6, in a period of approximately 3 ms to approximately 4 ms an operating state is adjusted in which the grid-cathode voltage is approximately 250 V, which is represented by a graph 108 in FIG. 5. The voltage of the energy converter 38 provided upstream of the internal resistor 68 is approximately 500 V here, and this is represented by a graph 104. The electrical voltage across the focusing unit 24 in series with the switching unit 28, which is in the switched-on switching state in the present case, is approximately 300 V, and this is represented by a graph 106. In the graph in FIG. 6 an electrical current of approximately 40 mA is provided for this period, and flows through the adjustable voltage divider 36. This is represented by a graph 110.

At instant t=4 ms the desired value for the grid-cathode voltage or the first electric grid potential is changed via the control signal 44, and, more precisely, to a grid-cathode voltage of approximately 150 V, as can be seen with reference to the graph 108 in FIG. 5. Owing to the previously described positive feedback, the control unit 74 will now control the energy converter 38 in such a way that the voltage provided by it compensates the higher load, so that, in accordance with the graph 106, a largely constant voltage is provided. For this the voltage provided by the energy converter 38 increases accordingly, and, more precisely, to a value of approximately 1,000 V. From an instant of approximately t=6.5 ms the value for the first electric grid potential is then reset again to the value indicated before the instant t=4 ms. Accordingly, the electrical voltages change in accordance with the graph 104, 108. From FIG. 6 it can be seen that in the range of t=4 ms to t=6.5 ms there is an electrical current of approximately 150 mA. In said period this results in a considerable power loss, which not only has to be provided by the energy converter 38, but at the same time also has to be dissipated at the high-voltage side, in particular by the adjustable voltage divider 36. This can also result in defects or disruptions. A scenario will be described below, which reduces or avoids this problem.

A third operating state can be provided, moreover, in which the switching unit 28 is in the switched-on switching state and the transistor 32 is operated in a switching mode in the switched-on switching state. The grid electrode can be short-circuited as a result.

Figure 7:
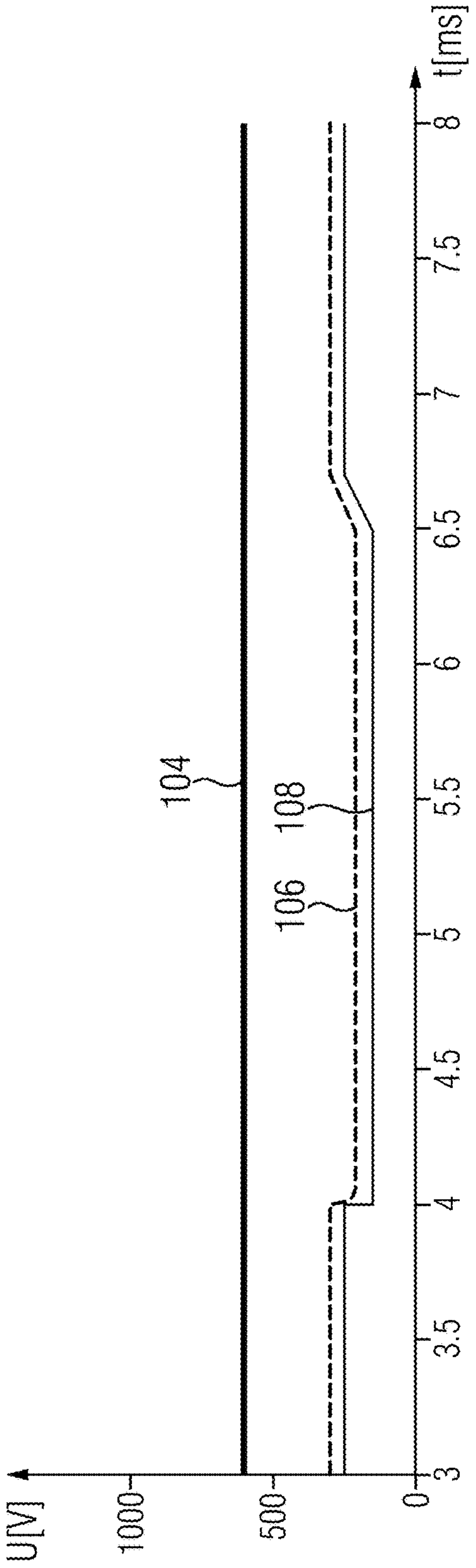
FIG. 7 shows a schematic graph representation of the electrical voltages in FIG. 5 in the first operating state.
Figure 8:
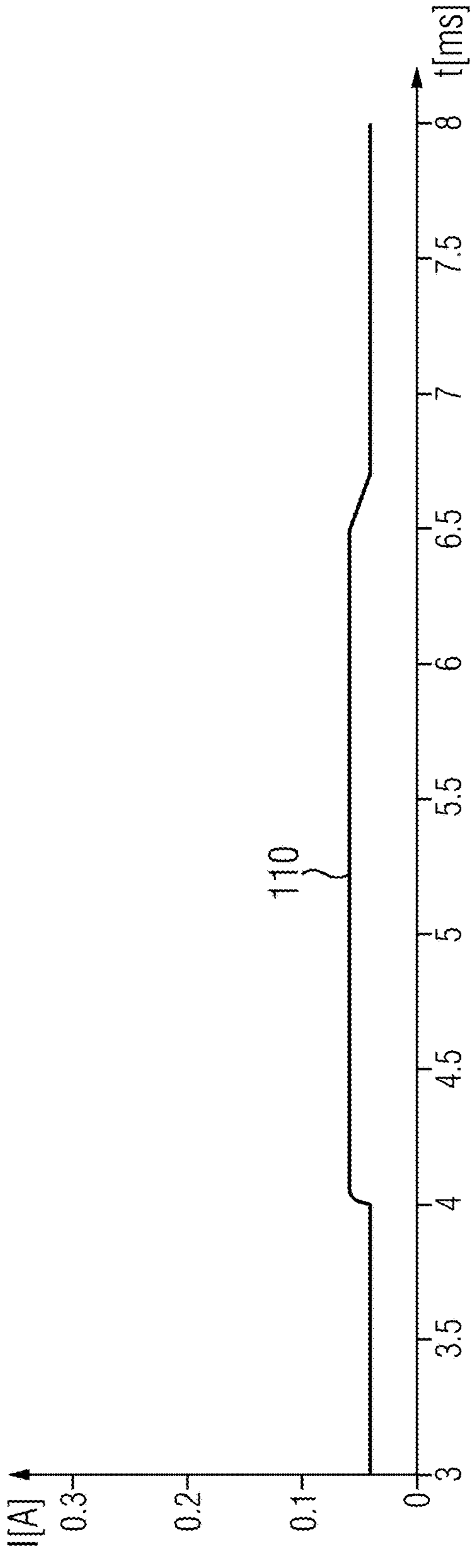
FIG. 8 shows a schematic graph representation of the supply current in FIG. 6 in the first operating state.

FIGS. 7 and 8 refer to schematic graph representations like FIGS. 5 and 6, likewise for the first operating state, and, more precisely, with application of one or more example embodiments of the present invention, in which the voltage provided by the energy converter 38 is permanently adjusted by the voltage transformer 76. These two figures also belong together. The graphs again refer to the same variables as already illustrated in relation to FIGS. 5 and 6. As can be seen from FIGS. 7 and 8, the voltage provided by the energy converter 38 is now permanently adjusted here by the control unit 74 to a fixed value of approximately 500 V. At the instant t=4 ms the change state illustrated in relation to FIGS. 5 and 6 is brought about again. From the representations it can be seen that the grid-cathode voltage is accordingly adjusted. At the same time the supply voltage for the adjustable voltage divider 36 is also reduced hereby, by a small value. At the instant of approximately t=6.5 ms the change is reset again. From FIG. 8 it can be seen that the current likewise increases slightly. From FIGS. 7 and 8 it can be seen that with application of one or more example embodiments of the present invention stable operating behavior can be achieved in the first operating state without the large power loss with respect to the application represented in FIGS. 5 and 6.

The higher-order controller 90 predefines a value for the first electric grid potential. The control unit 74 accordingly provides an output voltage through the energy converter 38. Furthermore, the predefined value for the first electric grid potential is transmitted to the control circuit 40 via the auxiliary converter 82. On the basis of the frequency of the control signal 44, the control circuit 40 recognizes the switching state for the switching unit 28 and switches it into the switched-on switching state. The control circuit 40 recognizes that the frequency is greater than a predefined minimum frequency, below which the switching unit 28 should be switched in the switched-off switching state. Furthermore, it can be provided that a maximum frequency is predefined, on detection of which by the control circuit 40 via the switching unit 28 and the transistor 32 there is direct coupling to the electrical cathode potential, whereby a short-circuit can virtually be achieved between the grid electrode 18 and the cathode 16. Intermediate values in relation to the frequency can then be used to determine a respective value for the first electric grid potential in that a respective value is assigned to a respective frequency.

The function of this circuitry principle can also be seen by way of the schematic circuit diagram representation of the circuit arrangement 22 in FIG. 3, in which the voltage detection unit 84 is used for the first operating state with respect to the first operating state in FIG. 2. Unit 86 is used for the second operating state by contrast.

In an alternative embodiment to the second operating state, it can be provided that an output current of the voltage transformer 76 can be used to simplify a characteristic diagram for control or regulation. Control or regulation can take place on the basis of this output current here.

In a further alternative to the second operating state, a minimum value and a maximum value can be predefined for an input current of the resonant converter 78. A tolerance band regulation can then be achieved on the basis of this. For example if the voltage provided by the energy converter 38 is too small for adjusting a predefined value for the first electric grid potential by way of the adjustable voltage divider 36, owing to the regulating functionality of the control circuit 40, the current through the transistor 32 could become zero. The input current of the resonant converter 78 could also undershoot the minimum value thereby. In this case it is provided that the control unit 74 carries out regulating in such a way that the voltage provided by the voltage transformer 76 is increased. It is then no longer the voltage which is regulated, but the current instead. If said positive feedback would increase the voltage provided by the energy converter, and therewith also the current for the adjustable voltage divider 36, it would be possible to limit the maximum current in the same way. Overall, at least in the second operating state, with application of one or more example embodiments of the present invention, it is possible for the input voltage of the transformer 98 to remain substantially stable.

Figure 9:
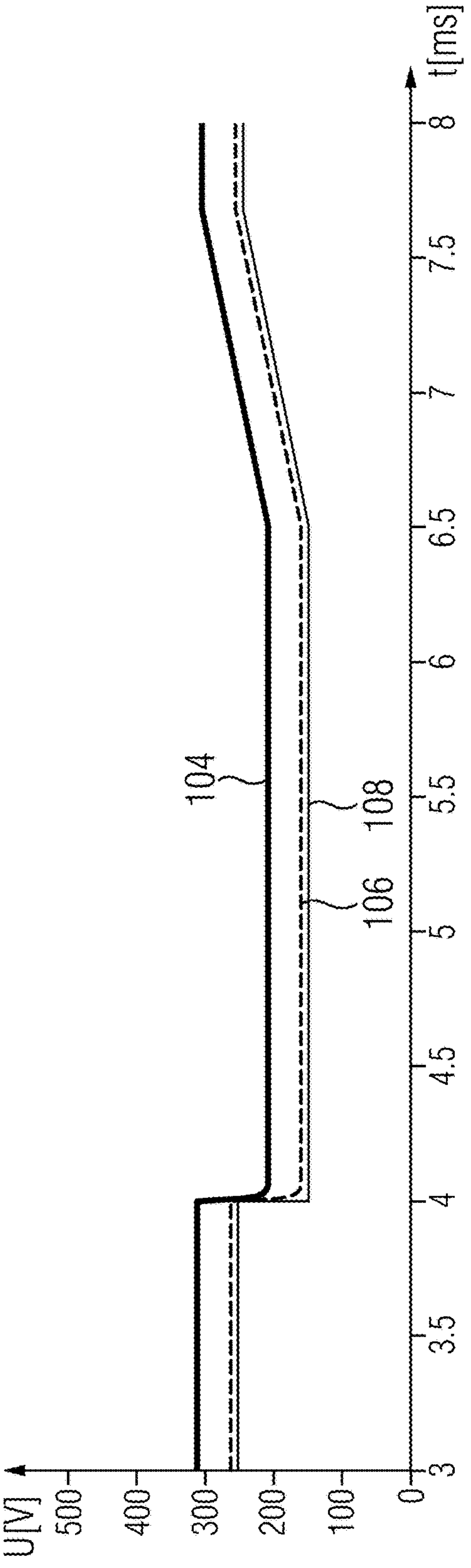
FIG. 9 shows a schematic graph representation of the electrical voltages in FIG. 4 in the first operating state.
Figure 10:
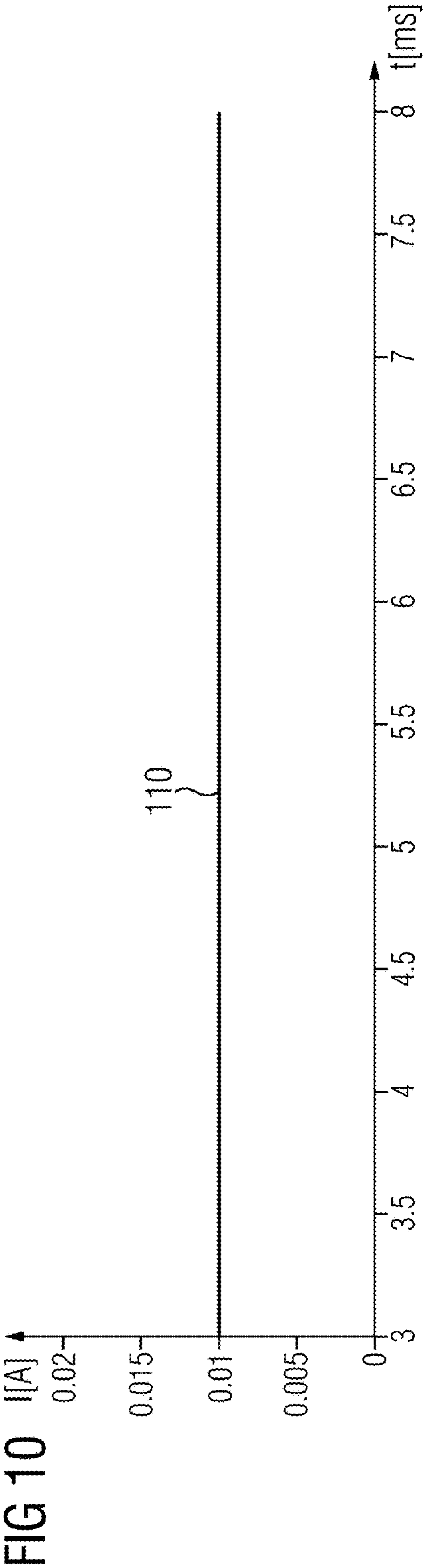
FIG. 10 shows a schematic graph representation of the supply current in FIG. 6 in the first operating state.

FIGS. 9 and 10 show in schematic graph representations, like FIGS. 5 and 6, the situation for the first operating state in accordance with a further embodiment of the present invention, as will be illustrated below. The reference characters of the graphs of FIGS. 9 and 10 correspond to the respective graphs in FIGS. 5 and 6. The graph axes correspond to those as have already been illustrated in relation to FIGS. 5 and 6. These two figures also belong together. In this embodiment of the present invention it is provided for the first operating state that, at least in the focusing mode, the voltage provided by the energy converter 38 is based on a current source characteristic. This can be achieved by suitable regulating via the control unit 74. Furthermore, there exists the possibility of increasing an operating frequency or clock rate of the resonant converter 78 in order to operate it in the actual resonance, in particular the LLCC resonance. At this frequency an output current of the resonant converter 78 is substantially independent of a load and determined only by an oscillating circuit inductance and an input voltage of the resonant converter 78. As a result, regulating by way of the controller 74 and the resonant converter itself can be operated in a controlled manner because, owing to the current source characteristic, a suitable, sufficiently high voltage can always be established at the output of the energy converter 38. A sufficient regulating reserve can be achieved for normal operation of the focusing unit 24, in particular of the adjustable voltage divider 36. This is shown by the schematic block diagram representation in FIG. 4 in which the transformer detection unit 86 does not need to be used for the focusing mode. The undesirable positive feedback can be avoided hereby.

As can be seen from FIGS. 9 and 10, in accordance with the graph 110, the current is—independently of carrying out the changes in relation to the value for the first electric grid potential, almost independently substantially at a value of approximately 10 mA. From FIG. 9 it can be seen that the corresponding voltages are varied. With respect to FIG. 5, it can be seen that the voltage provided by the energy converter 38 in the period of approximately 4 ms to approximately 6.5 ms in the third operating state is even smaller than in the period before t=4 milliseconds. Normal operation can be achieved with particularly low power as a result. This is advantageous for the construction of the circuit arrangement, in particular of the X-ray device 10, because, firstly, much less power is required compared to the first operating state and, secondly, owing to the much lower power during normal operation, the components can have a more cost-effective and more compact design.

To be able to achieve further advantages in respect of normal operation it can be provided that in particular the inverter 96 can be dynamically operated in respect of its operating mode. This can take into account the fact that the pinch-off voltage, as a rule, lies in a range of several kilovolts. As a rule, the focusing voltage in the focusing mode is, by contrast, only a few 100 V. It can therefore be advantageous in the focusing mode to deactivate one of the half-bridge circuits of the inverter 96. The voltage transmission ratio of the resonant converter 78 can thereby be reduced, substantially halved, accordingly.

In an alternative embodiment it can also be provided that two separate converters are provided. With a change between providing the pinch-off voltage and the focusing voltage, it is possible to switch over between outputs of the converter. For example short switchover times, in particular great rates of change, for example on a switchover from focusing to blocking or pinching-off of the electron flow, can be achieved thereby. A switchover time from blocking or pinching-off of the electron flow to focusing can be determined by the focusing unit. Each of the converters can be optimally designed for its output voltage range.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Although the present invention has been shown and described with respect to certain example embodiments, the example embodiments serve solely to illustrate the present invention and do not limit it. Equivalents and modifications will occur to others skilled in the art upon the reading and understanding of the specification. The present invention includes all such equivalents and modifications and is limited only by the scope of the appended claims.

What is claimed is:

1. A method for operating an X-ray tube having at least one grid electrode arranged between an anode electrode and a cathode electrode, wherein an electron flow from the cathode electrode to the anode electrode is focused via a focusing unit, and wherein the focusing unit is configured to supply the at least one grid electrode, at least in a focusing mode, with a first electric grid potential to focus the electron flow, the method comprising:

supplying the focusing unit with electrical energy in an electrically isolated manner via an energy converter;

providing the first electric grid potential via an adjustable voltage divider of the focusing unit;

adjusting the adjustable voltage divider via a control circuit of the focusing unit, the adjusting including supplying the control circuit with at least one electrically isolated control signal of a control unit that is electrically isolated from the X-ray tube, wherein the at least one electrically isolated control signal depends on a value for the first electric grid potential; and adjusting an electric power of the energy converter based on the value for the first electric grid potential.

2. The method as claimed in claim 1, further comprising:

selecting the electric power of the energy converter based on at least one of electric power, an electrical voltage or an electrical current of the focusing unit, the at least one of the electric power, the electrical voltage or the electrical current being required by the focusing unit to provide the first electric grid potential.

3. The method as claimed in claim 2, further comprising:

ascertaining the electric power of the energy converter based on a characteristic diagram.

4. The method as claimed in claim 2, wherein the energy converter is operated in an operating mode in which the energy converter provides an adjustably constant electrical current at a side of the focusing unit.

5. The method as claimed in claim 2, wherein the energy converter includes a voltage transformer coupled to an electrical energy source and an electrically isolating resonant converter, the electrically isolating resonant converter is electrically coupled to the voltage transformer at an input side, and at least to the focusing unit at an output side, and an input current of the electrically isolating resonant converter is adjusted based on the value for the first electric grid potential.

6. The method as claimed in claim 5, wherein a minimum current value and a maximum current value are defined for the input current, and the method includes detecting the input current, comparing the input current with at least the minimum current value or the maximum current value, and adjusting an electrical voltage provided by the voltage transformer for the electrically isolating resonant converter based on the comparing.

7. The method as claimed in claim 1, further comprising:

ascertaining the electric power of the energy converter based on a characteristic diagram.

8. The method as claimed in claim 1, wherein the energy converter is operated in an operating mode in which the energy converter provides an adjustably constant electrical current at a side of the focusing unit.

9. The method as claimed in claim 1, further comprising:

ascertaining the electric power of the energy converter based on an adjustment reserve for the adjustable voltage divider.

10. The method as claimed in claim 1, wherein the energy converter includes a voltage transformer coupled to an electrical energy source and an electrically isolating resonant converter, the electrically isolating resonant converter is electrically coupled to the voltage transformer at an input side, and at least to the focusing unit at an output side, and an input current of the electrically isolating resonant converter is adjusted based on the value for the first electric grid potential.

11. The method as claimed in claim 10, wherein a minimum current value and a maximum current value are defined for the input current, and the method includes detecting the input current, comparing the input current with at least the minimum current value or the maximum current value, and adjusting an electrical voltage provided by the voltage transformer for the electrically isolating resonant converter based on the comparing.

12. The method as claimed in claim 10, wherein the electrically isolating resonant converter is always operated in a resonance mode at least during a focusing operation.

13. The method as claimed in claim 10, wherein the electrically isolating resonant converter includes a full bridge circuit having two half-bridge circuits, and the method includes activating, during a focusing operation, one of the two half-bridge circuits and at least temporarily deactivating others of the two half-bridge circuits.

14. The method as claimed in claim 1, wherein a frequency of the electrically isolating control signal depends on the value for the first electric grid potential, and the method includes ascertaining, by the control circuit, the value for the first electric grid potential from the frequency of the electrically isolating control signal.

15. The method as claimed in claim 14, further comprising:

deactivating the focusing unit in the case of a defined frequency.

16. The method as claimed in claim 14, further comprising:

adjusting an output current of a voltage transformer based on the value for the first electric grid potential.

17. The method of claim 15, wherein the defined frequency is a maximum or a minimum frequency.

18. A circuit arrangement for operating an X-ray tube having at least one grid electrode arranged between an anode electrode and a cathode electrode, the circuit arrangement comprising:

a focusing unit configured to focus an electron flow from the cathode electrode to the anode electrode, and to supply the at least one grid electrode, at least in a focusing mode, with a first electric grid potential to focus the electron flow;

an energy converter configured to supply the focusing unit with electrical energy in an electrically isolated manner; and a control unit configured to adjust an electric power of the energy converter, the control unit being electrically isolated from the X-ray tube;

wherein the focusing unit has an adjustable voltage divider and a control circuit configured to control the adjustable voltage divider;

wherein the control unit is configured to provide at least one electrically isolated control signal for the control circuit, the at least one electrically isolated control signal being based on a value for the first electric grid potential;

wherein the control circuit is configured to adjust the adjustable voltage divider based on the at least one electrically isolated control signal; and the control unit is configured to adjust the electric power of the energy converter based on the value for the first electric grid potential.

19. The circuit arrangement as claimed in claim 18, further comprising:

a switching unit configured to supply, in a first switching state, the at least one grid electrode with the first electric grid potential focusing the electron flow, and supply, in a second switching state, the at least one grid electrode with a second electric grid potential for pinching-off the electron flow between the anode electrode and the cathode electrode.

20. An X-ray device comprising:

an X-ray tube having at least one grid electrode arranged between an anode electrode and a cathode electrode; and a circuit arrangement as claimed in claim 18, the circuit arrangement connected, via a connecting cable, to the X-ray tube to operate the X-ray tube.

* * * * *